Aug. 30, 1927.                    W. D. NICKUM                    1,640,367
                                     BRAKE
                              Filed April 3, 1925          2 Sheets-Sheet 1
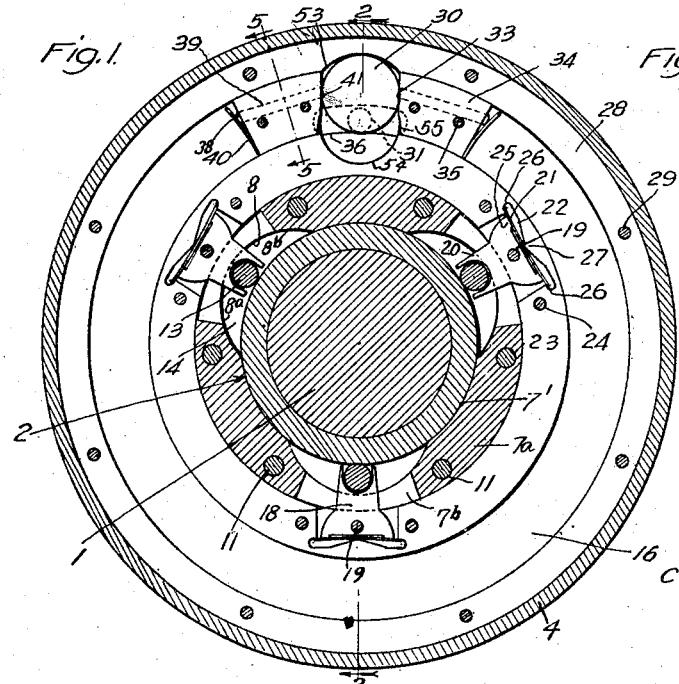
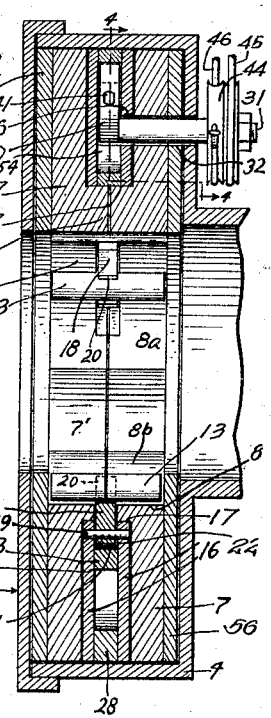
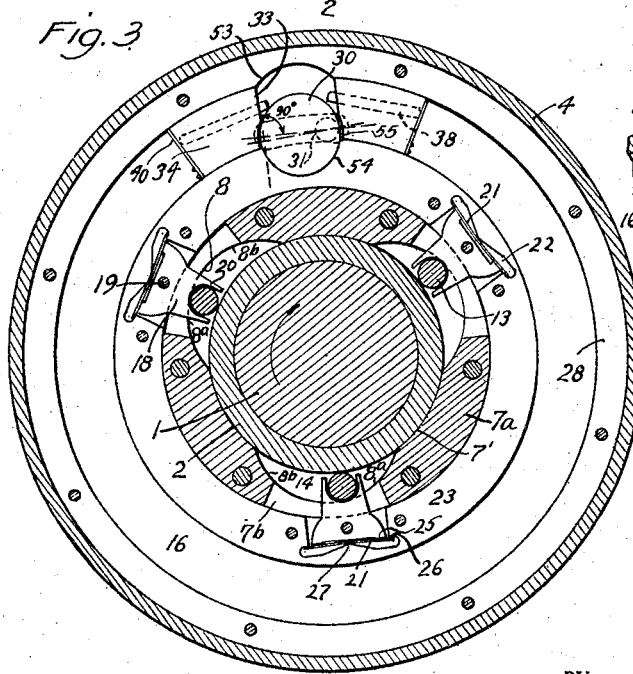
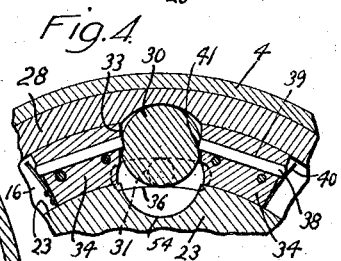
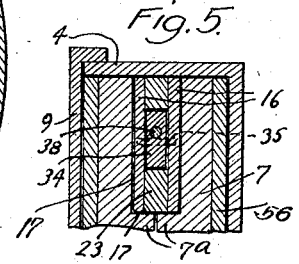
INVENTOR.
Walter D. Nickum,
BY Arthur P. Knight
ATTORNEY.

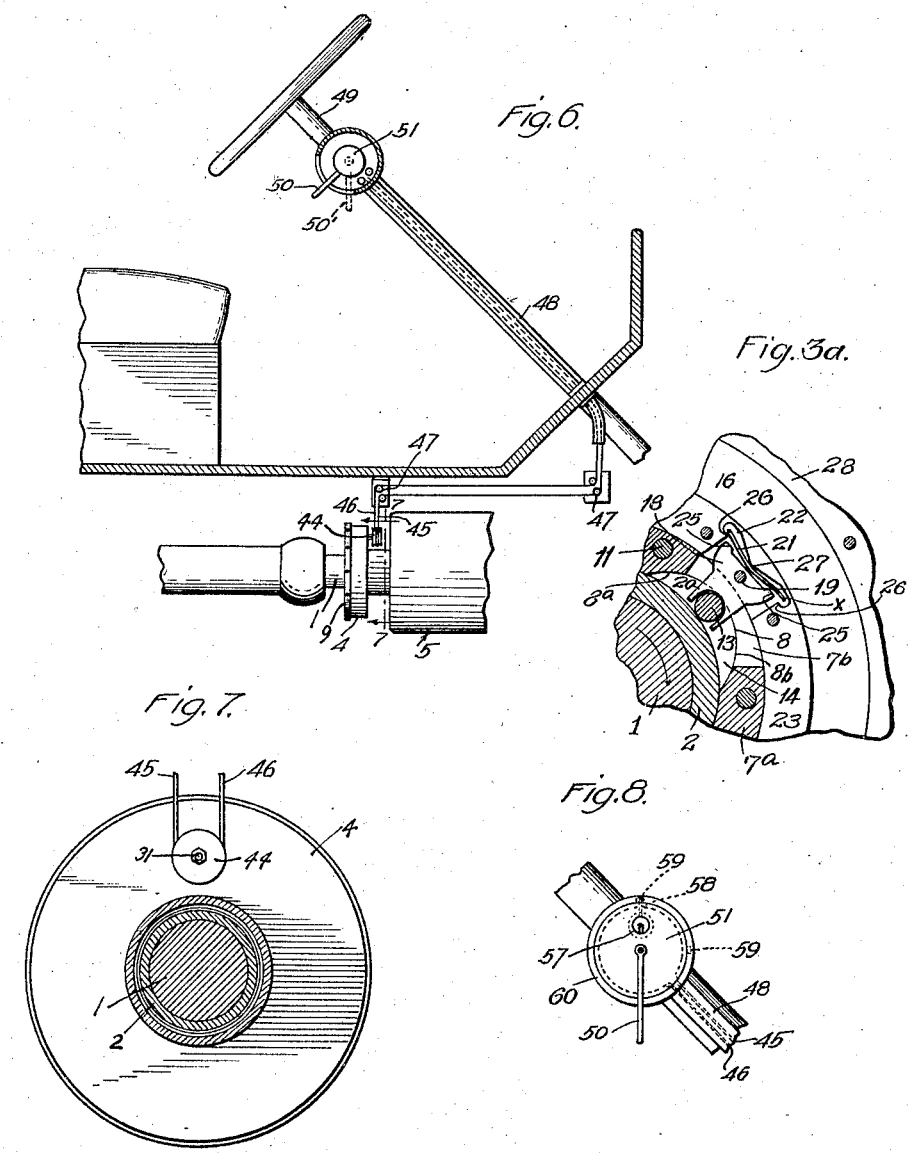

Patented Aug. 30, 1927.

1,640,367

UNITED STATES PATENT OFFICE.

WALTER D. NICKUM, OF LOS ANGELES, CALIFORNIA.

BRAKE.

Application filed April 3, 1925. Serial No. 20,364.

This invention relates to an improvement in brakes and particularly in brakes for automobiles or other vehicles and the main object of the invention is to provide an improved braking device for holding the vehicle or other mechanism to which it is connected from motion in one direction while freely permitting movement in the opposite direction. A further object of the invention is to provide means for ensuring instantaneous release of the braking means when desired. Another object of the invention is to provide improved means for control of the operation and release of the braking means. A further object of the invention is to provide convenient shifting means whereby the braking device may be readily controlled so as to apply the braking action in one direction or the other.

In the operation of automobiles or other motor vehicles it is often desirable to provide for holding or braking the vehicle from motion in one direction while permitting free movement in the opposite direction. For example if it is necessary to arrest the movement of the machine while ascending a hill it is desirable to temporarily hold the machine so that it can not move backward down the hill and at the same time hold it in readiness for starting up the hill when desired. Thus the machine may be parked facing up hill and if the emergency brake is used upon stopping to hold it from downward movement the resultant braking action would interfere with the starting of the machine up hill. But by providing for a brake which prevents backward movement while permitting free forward movement, the machine can be parked under such conditions without using the emergency brake and it can be immediately started forward up hill without any brake resistance. Similarly when a machine is parked facing down hill and against a curb so that it is necessary to back out in starting the machine, it is desirable to provide for holding the machine against forward movement down hill but to enable free movement in reverse up hill to start the machine. Moreover when a machine ascends a grade, particularly in case where there is considerable traffic so that frequent stops and starts have to be made, a braking device which prevents rearward movement of the machine while permitting free forward movement is especially desirable as it greatly facilitates such repeated stopping and starting, and eliminates the repeated use of the foot brake, which ordinarily must be applied each time the car stops, and then gradually released as the clutch engages each time the car starts.

My invention comprises in connection with a shaft or rotary member, fixed means provided with recess means having inclined faces arranged adjacent said shaft or rotary member, grip means or chock means adapted to engage between the said inclined faces and the shaft of the rotary member to grip the same, control means for operating said grip or chock means into or out of operative position, and spring controlled means operating upon said grip means and tending to move and hold the same to normal position. The invention further comprises means as above described and provided with oppositely arranged inclined faces for engagement and release of the gripping means in either direction of rotation and control means for the gripping means whereby the braking action can be effected in either direction, while leaving the shaft and rotary member free to turn in the opposite direction.

In some cases means may also be provided for locking the control means in position to effect engagement of the gripping means in one direction or the other, and in such cases a further object of the invention is to prevent theft of the vehicle by an unauthorized person, as hereinafter described.

The accompanying drawings illustrate an embodiment of my invention and referring thereto:

Fig. 1 is a transverse section of the braking mechanism showing the gripping means in normal or inoperative position.

Fig. 2 is a section on line 2—2 in Fig. 1.

Fig. 3 is a view similar to Fig. 1 showing the gripping means in operative position.

Fig. 3ᵃ is a detail view of one of the gripping members and the shifting finger therefor, showing in exaggerated manner the resilient action of such shifting finger to permit free rotation of the driven member in one direction.

Fig. 4 is a section on line 4—4 in Fig. 2.

Fig. 5 is a section on line 5—5 in Fig. 1.

Fig. 6 is a diagrammatic vertical section of a portion of a motor vehicle showing a manual control means for the braking device.

Fig. 7 is a section on line 7—7 in Fig. 6.

Fig. 8 is a side view of a modified form of a manual control means provided with locking means.

I have shown in the drawings at 1 a rotary shaft or member, which may for example be the transmission shaft of a motor vehicle and which may be provided with a sleeve 2 secured thereto in any suitable manner, the exterior cylindrical surfaces of said sleeve forming one member of the braking means as hereinafter described. In some applications of my invention the sleeve 2 may be either a drum or disk suitably attached to a rotating or driven member of the device to which it is applied. Mounted adjacent to and surrounding the sleeve 2 are plates or disks 7 bored out as at 7' so as to fit around said sleeve and having inwardly extending annular flanges 7ª which abut one another so as to form a continuous cylindrical surface surrounding the sleeve 2 and leaving an annular channel 17 between said members 7 in which the controlling members of the chock roller devices hereinafter referred to are mounted. The plates or disks 7 may be rigidly mounted in a suitable housing or casing 4 which may be secured to any suitable support so as to be retained in a stationary non-rotative position, said housing or casing 4 being for example attached to or included in the transmission casing 5 as indicated in Fig. 6. Adjacent to the bore 7' of the plates or disks 7 are pockets or recesses 14 suitably inclined or curved to cooperate with the gripping chocks or rollers 13 hereinafter described. Cheek plates 56 may be provided outside the respective members 7 to close the respective recesses 14, at both ends, or the said recesses may be covered by the ends of the housing or casing 4, which may have a cover plate 9 and the members 4 and 9 of the casing and the respective plates or disks 7 may be secured together by any suitable means for example by bolts 11, so that said plate members 7 are held rigidly from rotation. The gripping means consists of chock members preferably in the form of rollers or cylinders 13 which extend parallel to the axis of the shaft 1 and within the pockets or recesses 14 formed between the sleeve 2 and the faces 8 of the said recesses 14, said rollers or cylinders 13 being of such diameter that they tightly engage between the periphery of the sleeve 2 and the inclined or curved faces 8 when moved in either direction from a normal or central position, but will release from tight engagement when in normal position. The inclined or curved faces 8 of the pockets or recesses 14 are preferably symmetrical with respect to the certain lateral line drawn from the axis of the shaft 1 to the mid length of each recess face and converge toward the periphery of sleeve 2 either way from such line so as to form two inclined faces 8ª and 8ᵇ having reverse inclinations in such manner that when the gripping roller or chock 13 is at one end of the recess it will be engaged between one of the said inclined faces in one direction of movement of the sleeve 2, and release in the opposite direction of movement and when the chock or roller is at the opposite end of the recess it will engage with the other inclined face and the sleeve 2 when the direction of movement is reversed.

The position of the gripping rollers or chocks 13 in the respective slots 14 are controlled by the controlling means aforesaid through the operation of shifting fingers or members 18, pivotally mounted by pins 19 on rings 16 which are mounted in the annular channel 17 aforesaid to rotate around the axis of the shaft 1. An intermediate ring 23 is connected by pins 24 to the rings 16 so that the two rings 16 and the ring 23 constitute in effect a single annular member (c) in which the shifting members 18 are pivotally mounted. Another ring 28 may also be mounted between control rings 16 and may be secured thereto by pins 29. Said intermediate ring 23 has recesses 22 to receive the shifting fingers; each recess 22 having offset shoulders 26 against which rests a leaf spring 21 and the outer wall of each recess having an inward projection 27 bearing against the middle of said spring so that the spring is retained by engagement with the projection 27 and the shoulders 26. Flanges 7ª are recessed at 7ᵇ to permit free operation of shifting fingers 18, and said fingers are provided with recessed portions 20 engaging chock rollers 13 to shift the same. Each shifting member 18 is provided with two lugs or projections 25 at opposite sides of its pivot, which in the normal position of the finger, bear on the leaf spring 21 aforesaid so as to hold the shifting finger in a central or normal position along a line extending through the center of pivot 19 and the center of shaft 1 and to thereby hold the corresponding rollers or chocks 13 in a central position with respect to the aforesaid line in the respective slot 14 in which position it is free from engagement with both of the inclined faces of said slot. By moving the shifting fingers 18 one way or another from this normal position the rollers or chocks 13 may be moved into engagement with one or the other of the said inclined faces 8.

For moving the control rings 16 and the parts carried thereby in order to set or release the brake in either direction any suitable means may be provided, but in case of application of the invention to a motor vehicle I prefer to use manual control devices accessible from the driver's seat for example as shown in Figs. 6 and 7, and I have illustrated in Figs. 1 to 5 an eccentric means for effecting the required angular movement of the control rings 16 for effecting the setting and releasing operation, such eccentric being connected and operated by the manual control means above referred to. In this embodiment of my invention the eccentric indicated at 30 is mounted on a rock shaft 31, which is mounted to turn in bearing 32 in the casing 4 and in one or both of the plates or disks 7, said eccentric being adapted to engage cheeks or faces 33 on plates 34 which extend between the control rings 16 and are secured thereto by pins 35 so that motion of said plates around the axis of shaft 1 results in similar motion of the controlling rings 16 and of the parts carried thereby. The rock shaft 31 passes through one of the control rings 16 which is slotted as shown at 36 to enable angular movement of said control ring around the axis of shaft 1. In case it is desired to provide for locking the actuating eccentric 30 in normal position this may be effected by any suitable means, for example by pins 38 sliding in bores 39 in respective cheek plates 34 and operated by springs 40 so as to cause the inner end of each pin to engage in a recess 41 in the periphery of the eccentric 30.

The operation of the rock shaft 31 in one direction or the other effects by the means above described, the setting or release of the brake, and to effect such operation I may provide any suitable means for example as shown in Figs. 2, 6, and 7, said rock shaft may be provided with sheaves 44 secured thereto and having cable lines 45 and 46 secured to the respective sheaves and winding thereon in opposite directions, said cable lines passing over suitable guide rolls 47, and through a guide tube 48 mounted for example on the steering post 49, and being connected at their further ends to an operating handle 50 mounted on the steering post. The cable lines 45 and 46 may, as shown, be constituted by the two end portions of a single cable which extends around and is secured to a pulley 51 connected to operating handle 50.

The operation of the above described braking device is as follows:

With the parts in the position shown in Figs. 1 and 2 the gripping rolls 13 are in inoperative or neutral position. That is to say each roll is at the mid-point of the corresponding inclined or curved face 8 and shaft 1 and sleeve 2 are therefore free to turn in either direction without retardation by the gripping means, since in this position the rolls 13 will rotate freely in either direction. With the parts in this position the operating handle 50 is also in neutral or intermediate position as shown in Fig. 6. If it is now desired to bring the braking device into operation so as to check or prevent movement of shaft 1 and sleeve 2 in one direction or the other, operating handle 50 is moved in the proper direction, for example to the position indicated at 50' in Fig. 6. The movement of handle 50 to this position operates through cable 45 and corresponding sheave 44 to turn rock shaft 31 in a counter clock-wise direction (in Figs. 1 and 2), and to thereby cause eccentric 30 to engage plate 34 and rotate the controlling rings 16 together with the shifting fingers 18 carried thereby to the position shown in Fig. 3. Ring 28 may be cut away as at 53 to permit such motion of eccentric 30 and the recesses 41 in said eccentric must be sufficiently shallow to permit pins 38 to be pushed out of said recesses upon operation of the manual control means, so as to permit such movement. The ring 23 is also cut away or recessed as at 54 to permit eccentric member 30 to enter therein, and it will be observed that when the parts are in operative positions as shown in Fig. 3 the eccentric member 30 has been moved past dead center with respect to the left hand plate 34 so the pressure of said plate serves to hold said eccentric member in this position. If desired however in order to further ensure that eccentric member 30 will remain in this position the plates 34 may be slightly recessed as indicated at 55 so as to prevent said eccentric member from slipping back to neutral position. Such recess however is insufficient to prevent eccentric 30 from being moved out of this position upon operation of the manual control means as hereinafter described. By the above described operation the gripping chocks 13 are brought into engagement with one of the inclined portions 8$^a$ or 8$^b$ of the corresponding inclined faces 8, so as to be gripped between said inclined faces and sleeve 2 upon rotation of said sleeve in one direction, but to be moved sufficiently out of tight engagement upon rotation of said sleeve in the other direction to permit free rotation thereof. In the case illustrated in Fig. 3 in which chocks 13 are in contact with inclined faces 8$^a$ shaft 1 and sleeve 2 are free to turn in the direction indicated by the arrow in such figure, for upon movement in such direction the friction of sleeve 2 against gripping chocks 13 causes said chocks and shifting fingers 18 to be swung about the pivots 19 against the resilient force of springs 21 as indicated at ($x$) in Fig. 3$^a$, so as to move said gripping chocks out of tight engagement with said inclined faces 8$^a$ and thus permit said chocks to rotate and permit rotation of sleeve 2. When the rotation of shaft 1 and the sleeve 2 in the direction of free rotation is stopped, the resilient force of the leaf springs 21 on the respective lugs or projections 25 of the shifting fingers 18 causes the said shifting fingers 18 to force the chock rollers 13 into immediate tight engagement between the inclined faces 8 and the periphery of sleeve 2 so as to prevent any rotation of sleeve 2 in the opposite direction and thereby exerting a chock or brake action on the shaft 1. Any attempt to rotate such shaft in the opposite direction only serves to increase the tightness of engagement of chocks 13 between inclined face 8ª and sleeve 2, although causing little, if any perceptible motion of said chocks from the positions which they occupy when the shaft is stationary. As long as operating handle 50 remains in this position therefore the vehicle will be free to move in one direction, for example forward, but will be prevented from movement in the reverse direction. The return of operating handle 50 to intermediate position will immediately restore the device to neutral position and again permit free rotation of the shaft in either direction so as to permit the vehicle to move either forward or backward.

It will of course be understood that movement of operating handle 50 in the other direction will rotate the eccentric member 30 in the opposite direction, and will cause controlling rings 16 with the gripping means carried thereby to be shifted in a clock-wise direction about the axis of shaft 1, and bring said gripping chocks 13 into engagement with the opposite inclined portions 8ᵇ of inclined or curved faces 8, so as to exert a reverse chocking or braking effect to that above described. By manipulation of operating handle 50 therefor the device may be immediately shifted so as to be converted from a brake adapted to permit forward movement while preventing rearward movement to a brake adapted to permit rearward movement while preventing forward movement, or may be immediately shifted from either of these positions to neutral so as to permit free movement in either direction.

The above described braking device may be applied not only to the drive shaft or other drive member of an automobile or other motor vehicle for the purposes above set forth, but may be applied in connection with any rotating or rotatably mounted shaft or driven member.

The device may also be used as a means for locking the vehicle against movements in one direction or the other, and preferably against forward movement, when leaving the same, in order to prevent theft thereof. It will be evident that with the brake device locked in such position as to permit only rearward movement, it would be impracticable for anyone to steal the vehicle, as it could not be driven wholly in reverse for any considerable distance without arousing suspicion. For this purpose the manual control pulley or grooved wheel 51 may be provided, as shown in Fig. 8, with suitable locking means 57 controlling a bolt 58 adapted to enter within recesses 59 in a casing 60 when the control lever 50 is moved to either operative position, said casing 60 being rigidly mounted at the side of the steering-post or in other convenient position. It will of course be understood that in this case it will also be desirable to entirely enclose cable lines 45 and 46 throughout their length, as well as sheaves 44 so as to prevent tampering with any part of the control means.

The above-described braking device is not limited to use with automobiles or other vehicles, but may advantageously be used in connection with mine hoists or elevators, the purpose being in this case to permit free upward movement while preventing downward movement in case of accident, and also to enable the device to be operated to permit such downward movement when desired. For this purpose the device may be applied to a rotating member of the mechanism, for example to the shaft of the winding drum of a cable operated hoist.

I claim:

1. A chock brake means comprising, in combination with a rotatably mounted driven member, a rigidly mounted operating member having recess means with reversely inclined surfaces mounted around and adjacent to the periphery of said driven member, chock means within said recess means, a control member rotatably mounted in said operating member and having pivotally mounted resilient shift means engaging said chock means so as to move said chock means in said recess means upon rotation of said control member, and means for rotating said control member into position to bring said chock means into engagement with either one of said reversely inclined surfaces of said recess means or into an intermediate position in which said chock means are out of engagement with both of said reversely inclined surfaces and for holding said control member in any one of said positions to which it is moved.

2. A chock brake means comprising in combination with a rotatably mounted driven member, a rigidly mounted operating member having recesses with reversely inclined surfaces mounted around and adjacent to the periphery of said rotatably driven member, chock rollers mounted in said recesses and parallel to the axis of said driven member, a control member rotatably mounted in an annular channel in said operating member having pivotally mounted resiliently operated shift members adapted to engage and movably control the position of said chock rollers in said reversely inclined recesses, and means for rotatably moving and resiliently locking the said control member in such manner that the said resilient shift members pivotally mounted thereon will move and hold the said chock rollers into or out of engagement between one or another of the said reversely inclined recess surfaces and the periphery of the said driven member.

3. A chock brake means comprising, in combination with a rotatably mounted driven member, a rigidly mounted operating member having recesses with reversely inclined surfaces disposed around and adjacent to the periphery of said rotatable driven member, chock rollers movably mounted in said recesses and parallel to the axis of said driven member, a control member rotatably mounted in an annular channel in said operating member and having pivotally mounted resiliently operated shift members adapted to engage and resiliently control the position of said chock rollers in said reversely inclined recesses, means for rotatably moving and resiliently locking the said control member and the said resiliently operated shift members pivotally mounted thereon into position to cause said chock rollers to be engaged between one or the other of said reversely inclined surfaces and the periphery of said driven member or to cause said chock rollers to be free of such surfaces, and resilient spring means mounted in said control member and cooperatively operating with said pivotally mounted shift members in such manner that when said chock rollers are held in engagement between one of said inclined surfaces and the periphery of said driven member said shift member will have sufficient resiliency to allow free movement between said chock rollers and said driven member in one direction of rotation but will immediately force the said chock rollers into tight engagement between said inclined surfaces and the periphery of said driven member when the rotation of the driven member in this direction is stopped, thereby preventing reverse rotation of said driven member.

4. A brake means comprising a driven shaft, a sleeve thereon, means rigidly mounted around and adjacent to said sleeve, said rigidly mounted means being formed with an annular channel and with recesses adjacent said sleeve and having two reversely inclined faces, chock rollers mounted in said recesses, a controlling member mounted to turn in said annular channel and resilient shift members carried by said control member and adapted to engage said chock rollers to shift same into engagement with one or the other of said inclined faces, a locking operating member mounted to turn said control member in said annular channel so as to move said chock rollers alternatively into engagement between said inclined faces and the periphery of said sleeve and thereby prevent a forward or reverse movement of the driven shaft.

5. A chock brake means comprising in combination a driven member, means rigidly mounted around and adjacent to said driven member, said rigidly mounted means being formed with an annular channel and with recesses adjacent said driven member and having reversely inclined faces, chock rollers mounted in said recesses, a controlling member mounted to turn in said annular channel and resilient shift members carried by said control member and adapted to engage said chock rollers to shift same into engagement between one or the other of said inclined faces and the periphery of said driven member, a locking operating member mounted to turn said control member in said annular channel into position to bring said chock rollers into engagement between one or the other of said inclined faces and the periphery of said driven member, and means for locking said operating member and the said control member in either of said positions so as to prevent rotation of said driven member in one direction.

6. A device for preventing motion of motor vehicles by unauthorized persons in one direction or the other comprising, in combination with a rotatably mounted member included in the drive mechanism of a motor vehicle in such manner as to rotate in one direction during forward motion of said vehicle and in the other direction during reverse motion of said vehicle, chock brake means having chock members movable into position to engage said rotatable member either in such position with respect to said brake means as to permit forward motion of the vehicle while preventing reverse motion thereof or in such position as to permit reverse motion while preventing forward motion thereof, control means for moving said chock members into either one of said positions, and key-operated locking means for locking said control means when said chock means are in either of said positions.

7. A chock brake means comprising in combination with a rotatably mounted driven member, a rigidly mounted operating member having recess means with reversely inclined surfaces mounted around and adjacent to the periphery of said driven member, chock means within said recess means, a control member rotatably mounted in said operating member and having pivotally mounted resilient shift means engaging said chock means and adapted to move same upon rotation of said control member in one direction or the other, into engagement with one or the other of said reversely inclined surfaces of said recess means, and means for rotating said control member so as to bring said chock means into either one or the other of said engaging positions and for holding the same in either of such positions.

8. A chock brake means comprising, in combination with a rotatably mounted driven member, a rigidly mounted operating member having recesses with reversely inclined surfaces mounted around and adjacent to the periphery of said driven member, chock rollers mounted in said recesses and parallel to the axis of said driven member, an annular channel in said operating member, a control member rotatably mounted in said annular channel and having pivotally mounted resilient shift members adapted to engage and movably control the position of said chock rollers in said recesses, and means for rotatably moving and holding the said control member in such manner as to cause said resilient shift members to move and hold said chock rollers into engagement between either one or the other of the reversely inclined surfaces of the respective recesses and the periphery of said driven member.

In testimony whereof I have hereunto subscribed my name this 26th day of March, 1925.

WALTER D. NICKUM.